United States Patent [19]

Stoutmeyer

[11] 3,777,305

[45] Dec. 4, 1973

[54] ULTRASONIC ANGLE MEASUREMENT SYSTEM

[75] Inventor: Ronald G. Stoutmeyer, China Lake, Calif.

[73] Assignee: The United States of America as represented by the Secretary of the Navy, Washington, D.C.

[22] Filed: Apr. 10, 1972

[21] Appl. No.: 242,540

[52] U.S. Cl.............................................. 340/16 R
[51] Int. Cl............................................. G01s 5/18
[58] Field of Search .................. 340/16 R, 5 R, 6 R, 340/3 T; 356/1, 5; 343/112 C, 112 D

[56] References Cited
UNITED STATES PATENTS
3,569,920  3/1971  Antman ............................. 340/5 R
3,205,475  9/1965  Foss .................................... 340/6 R Primary Examiner—Richard A. Farley
Attorney—R. S. Sciascia et al.

[57] ABSTRACT

An ultrasonic angle measuring system having three system-spatially fixed receivers and two transmitters mounted on a helmet wherein the time lapse information at the receivers of signals from the transmitters establishes the location and orientation of the helmet with respect to a reference position.

8 Claims, 2 Drawing Figures

SPHERICAL $X = \rho \sin \phi \cos \theta$
$Z = \rho \cos \phi$ (A)

POLAR $X = \rho \cos \alpha$
$Z = \rho \cos \xi$ (B)

ULTRASONIC ANGLE MEASUREMENT SYSTEM

BACKGROUND OF THE INVENTION

The present invention relates to the field of head-coupled aiming devices and, specifically, to pilot aimed missiles wherein the missile seeker head is slaved to the pilot's helmet such that the pilot's line-of-sight is the missile's aim direction.

If the pilot is provided with a sight on his helmet that is independent of eye movement, such as the sight disclosed in U. S. Pat. No. 3,633,988, entitled Helmet-Mounted Holographic Aiming Sight, filed July 10, 1970, by Reed A. Farrar, the problem of measuring the pilot's line-of-sight reduces to one of tracking his helmet, i.e., sensing the aim directon of the helmet. Important considerations, other than accuracy, for any helmet tracking scheme are the pilot's safety and comfort, and cockpit space. Pilot's safety and comfort impose restrictions on helmet weight, mechanical connections to the helmet, and fracturable material near the eyes. Cockpit space restricts the use of mechanical linkage and optical leverage. Of course, in any design the pilot's vision should not be obstructed by objects on the helmet or in the cockpit.

Two previous devices for measuring the position and orientation of the pilot's helmet within the cockpit are U. S. Pat. No. 3,617,015 entitled "Head-Coupled Missile-Aiming Device" by Floyd A. Kinder, a device wherein a mechanical linkage couples the pilot's head to a system-spatially fixed cockpit reference; and U. S. Pat. No. 3,678,283, entitled Radiation Sensitive Optical Tracker, filed Oct. 22, 1970, by Kenneth B. LaBaw, a device wherein at least two light sources and one photodetector are system-spatially fixed and one light source and one photodetector are mounted on the pilot's helmet. The patent and the application are assigned to the U. S. Government and are incorporated herein as background material.

DESCRIPTION OF THE PREFERRED EMBODIMENT

Figure 1:
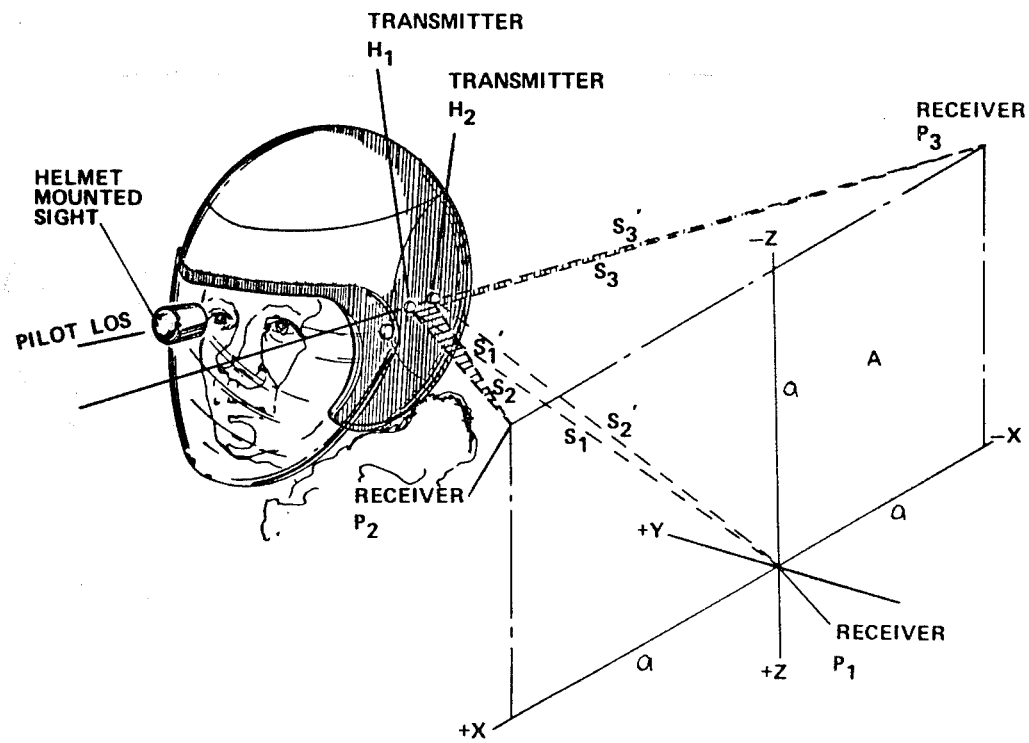
FIG. 1 is a plan view of the preferred embodiment of the present invention.

The present invention, shown in FIG. 1, is a system for acoustically locating the pilot's helmet within the cockpit and measuring the pilot's line-of-sight.

Two ultrasonic wave emitting transmitters $H_1$ and $H_2$ are positioned on a side of the helmet. The line determined by the $H_1$ and $H_2$ should be aligned parallel to the optical axis of a helmet sight, as shown in FIG. 1. That is, the transmitters should be positioned on the helmet such that they define a line parallel to the pilot's line-of-sight. And, three ultrasonic wave receiving devices $P_1$, $P_2$, and $P_3$ are mounted in a reference plane on the cockpit's structure.

The approach used in the present invention is to determine the distance from $H_1$ to $P_1$, to $P_2$, and to $P_3$; and from $H_2$ to $P_1$, to $P_2$, and to $P_3$. Knowing these distances, the distance between $H_1$ and $H_2$, and the locations of $P_1$, $P_2$, and $P_3$, the pilot's line-of-sight can be ascertained.

The frequency at the wave transmitter $H_1$ can be the same as, or different than, the frequency of the wave emitted by transmitter $H_2$. In either case, the transmitters are pulsed and the time it takes for the wave from each to arrive in each of the receivers is measured. That time indicates the distance from the transmitter to the receiver. If the frequency of the wave emitted by $H_1$ and $H_2$ are the same, $H_2$ should not be pulsed until the wave from $H_1$ is received by $P_1$, $P_2$, and $P_3$, and vice-versa. Otherwise, the system might confuse the wave from $H_1$ with the wave from $H_2$. A computer can be included in the system to obtain the distances of interest by processing the information generated and performing the mathematical computations herein disclosed.

The geometry of the system and the equations to be solved will now be discussed. Since we know that the distance between two points can be measured by the elapsed time of acoustical energy passing between the points, the following simplified geometrical relationship and equations are recognized by the inventor to define the pointing vector of a line drawn between the two points, i.e., two acoustical transducers mounted on an operator's helmet. As a result, the operator's head position and orientation is defined.

The present approach consists of fixed receiving devices $P_1$, $P_2$, and $P_3$ located in a reference plane A, and transmitting devices $H_1$ and $H_2$ mounted on a subject's head via a helmet or headpiece supporting structure. The line determined by transmitters $H_1$ and $H_2$ is first aligned parallel to the optical axis of a collimated sighting device also mounted on the helmet. FIG. 1 shows such a configuration in an inverted cartesian coordinate system, which is the coordinate system used in aircraft. Distances $s_1$, $s_1'$, $s_2$, $s_2'$, $s_3$, and $s_3'$ are measured acoustically in the manner discussed above.

From the geometry of FIG. 1 the following equations can be written for distances $s_1$, $s_2$ and $s_3$ to transmitter $H_1$.

$$s_1^2 = x^2 + y^2 + z^2$$
$$s_2^2 = (x - a)^2 + y^2 + (z + a)^2$$
$$s_3^2 = (x + a)^2 + y^2 + (z + a)^2$$

Solving these three equations for $x$ results in:

$$x = s_3^2 - s_2^2/4a$$

And, in a similar manner solving for $z$:

$$z = s_2^2 + s_3^2 - 2s_1^2 - 4a^2/4a$$

Repeating the computations for distances $s_1'$, $s_2'$ and $s_3'$ to transmitter $H_2$ results in the following;

$$x' = (s_3')^2 - (s_2')^2/4a$$

and $$z' = (s_2')^2 + (s_3')^2 - 2(s_1')^2 - 4a^2/4a$$

Note that in the specified coordinate system the direction cosines of the line between $H_1$ and $H_2$ are;

$\cos\alpha = x - x'/d$
$\cos\beta = y - y'/d$
$\cos\epsilon = z - z'/d$

Where $d$ is the known distance between $H_1$ and $H_2$. That is, $$d = \sqrt{(x-x')^2 + (y-y')^2 + (z-z')^2}$$

Figure 2:
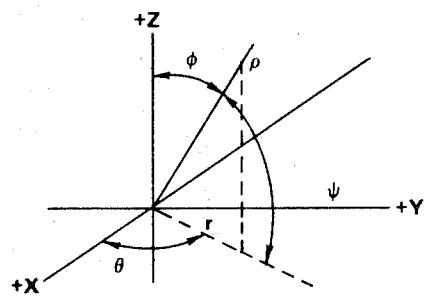
FIG. 2 is a schematic diagram of the spherical coordinate system (A) and polar space coordinate system (B) which maybe used to transform equations in the polar space coordinate system to the spherical coordinate system, if transformation is desired.
Figure 2:
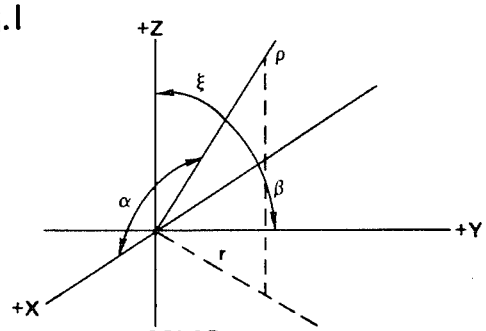

Note that in addition to finding $x$ and $z$ which define the object's orientation, $y$ can be found; and, $x, y$, and $z$ taken together define the object's position. The direction-cosines completely define the orientation (and position) of the object. And, for most applications this is sufficient. If desired, however, we can make the transformation to spherical coordinates from the polar space, or inverted cartesian coordinate, system as shown in FIG. 2 (the $x$, $y$, $z$ systems are shown upright for the sake of clarity), and the following equations result.

$$\cos \phi = \cos \epsilon$$
$$\cos \theta = \cos \alpha / \sin \phi$$

Note that $\Psi = 90° - \phi$. Therefore, $$\sin \Psi = \cos \epsilon,$$

or $$\sin \Psi = z - z'/d.$$

And, note also that $\sin \phi = \sin \epsilon$, with $$\sin \epsilon = \sqrt{d^2 - (z-z')^2}/d.$$

As a result, $$\cos \theta = x - x'/\sqrt{d^2 - (z-z')^2},$$
$$\Psi = \sin^{-1}(z-z'/d),$$

and $$\theta = \cos^{-1}(x - x'/\sqrt{d^2 - (z-z')^2})$$

$\theta$ and $\Psi$ can now be recognized as the spherical coordinate angles of the line drawn between $H_1$ and $H_2$.

As a result, using the approach of the preferred embodiment of the present invention, error in the orientation of the pilot's helmet will not be dependent on translational motion, i.e., motion in the $x$, $y$, or $z$ directions. As long as the pilot's head remains in his normal head-motion box, his line of sight will be defined by information obtained from the preferred embodiment of the present invention, which information is substantially independent of the $x$, $y$, and $z$ position of the pilot's helmet.

The present invention operates as follows:
Transmitters $H_1$ and $H_2$ both emit ultrasonic waves. The waves transmitted by transmitter $H_1$ are received by system-spatially fixed receivers $P_1$, $P_2$, and $P_3$ with the receiver nearest the transmitter receiving the pulsed wave first. That is, the receiver which is nearest transmitter $H_1$ will receive the emitted waves first, the second nearest receiver will receive the waves second, and the farthest receiver from the transmitter will receive the waves last. Knowing the positions of receivers $P_1$, $P_2$, and $P_3$, the moment transmitter $H_1$ transmitted the wave, and the time it took the wave to reach receivers $P_1$, $P_2$, and $P_3$, the distances from transmitter $H_1$ to receivers $P_1$, $P_2$, and $P_3$ can be determined. Thereby, the position of transmitter $H_1$ with respect to the systems-spatially fixed coordinate system is defined. Likewise, the position $H_2$ with respect to the system-spatially fixed coordinate system can be determined.

By knowing the position of transmitters $H_1$ and $H_2$, the distance between them, and the relationship of the line defined by the points in space occupied by the transmitters and the pilot's line of sight, the pilot's line of sight can be determined. For convenience, the mathematical computations necessary to define the pilot's line of sight should be performed by a computer, and where the present invention is used in an aircraft, preferably an on-board computer.

The present invention has the advantages of being a very light device which, when used in an aircraft, does not limit the pilot's normal head-motion box. It does not include any mechanical connections to the pilot which could cause discomfort and limit the operator's freedom of movement. Nor does it depend on illumination sources which dependence, likewise, would restrict the operator's freedom of movement.

What is claimed is:

1. An acoustical tracker system for determining the position and orientation of an object, comprising:
   first and second means attached to said object for radiating ultrasonic waves;
   first, second, and third ultrasonic wave detecting means system-spatially fixed for detecting said radiated ultrasonic waves and providing outputs in response thereto; and
   means coupled to said radiating means and said detecting means for processing said detecting means outputs, electronically calculating the distances from each said radiating means to each said detecting means, and providing an output of information defining the position and orientation of said object.

2. The tracker of claim 1 wherein the points in space occupied by said first, second, and third detecting means define a plane, and the second and third detecting means are equally spaced from the first detecting means.

3. The tracker of claim 1 wherein said object is an operators helmet and said tracker further comprises a helmet mounted sight which is independent of operator eye movement, such that thei tracker determines the orientation of the helmet and, thereby, the operator's line-of-sight.

4. The tracker of claim 3 wherein the points on the helmet occupied by said first and second radiating means define a line which is parallel to the operator's line-of-sight.

5. The tracker of claim 4 wherein the points in space occupied by said first, second, and third detecting means defines a plane, and the second and third detecting means are equally spaced from the first detecting means.

6. The tracker of claim 5 wherein said processing, calculating and providing means includes and aircraft, on-board computer.

7. The tracker of claim 6 wherein said computer determines the direction-cosines of the line between said first and second radiating means from the outputs of said detecting means.

8. A method of determining the orientation of an object wherein first and second wave radiating means are attached to the object at known positions and first, second, and third wave detecting means are system-spatially fixed at known positions, comprising the steps of;
   causing said first radiating means to radiate a wave,
   measuring the time it takes for the wave radiated by said first radiating means to travel to each of said detecting means,
   causing said second radiating means to radiate a wave, measuring the time it takes for the wave radiated by said second radiating means to travel to each of said detecting means,
converting the times measured to respective distance measurements, electronically determining the direction-cosines defining the line joining the first and second radiating means from the distance measurements.

* * * * *